(12) United States Patent
Lee et al.

(10) Patent No.: US 6,788,279 B2
(45) Date of Patent: Sep. 7, 2004

(54) IN-PLANE SWITCHING MODE LIQUID CRYSTAL DISPLAY DEVICE AND METHOD FOR FABRICATING THE SAME

(75) Inventors: Joun-Ho Lee, Taegu (KR); Doo-Hyun Ko, Kimi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 373 days.

(21) Appl. No.: 09/748,869

(22) Filed: Dec. 28, 2000

(65) Prior Publication Data

US 2001/0019320 A1 Sep. 6, 2001

(30) Foreign Application Priority Data

Dec. 31, 1999 (KR) .......................................... 1999-67842

(51) Int. Cl.[7] .......................... G09G 3/28; G02F 1/1343
(52) U.S. Cl. ........................................ 345/87; 349/141
(58) Field of Search ..................... 345/87–100; 349/42, 349/43, 44, 139, 140, 141–144

(56) References Cited

U.S. PATENT DOCUMENTS

| | | | |
|---|---|---|---|
| 5,497,255 A | * | 3/1996 | Yamazaki et al. .......... 349/116 |
| 5,905,556 A | | 5/1999 | Suzuki et al. |
| 6,052,165 A | * | 4/2000 | Janssen ....................... 349/84 |
| 6,194,273 B1 | * | 2/2001 | Matsuura et al. ........... 438/270 |
| 6,211,928 B1 | * | 4/2001 | Oh et al. ...................... 349/43 |
| 6,232,620 B1 | * | 5/2001 | Katoh .......................... 257/59 |
| 6,243,146 B1 | * | 6/2001 | Rho et al. .................... 349/42 |
| 6,281,957 B1 | * | 8/2001 | Oh et al. .................... 349/141 |
| 6,404,474 B1 | * | 6/2002 | Watanabe et al. .......... 349/141 |
| 2002/0008799 A1 | | 1/2002 | Ota et al. |

* cited by examiner

Primary Examiner—Amr Awad
(74) Attorney, Agent, or Firm—McKenna Long & Aldridge LLP

(57) ABSTRACT

An IPS-LCD panel includes first and second substrates, and a liquid crystal interposed therebetween. On the first substrate, gate and data lines are formed perpendicular to each other to define a pixel region. On the pixel region, pixel and common electrodes are formed perpendicular to the gate line, and transverse pixel and common lines are electrically connected with the pixel and common electrodes, respectively. Since a triangular groove is etched away around a cross point between the pixel electrode and the transverse pixel line, a uniform gap is achieved between the pixel and common electrodes. Due to the uniform gap, a uniform electric field is applied between the pixel and common electrode such that the liquid crystal molecules are aligned uniformly throughout the pixel region.

33 Claims, 4 Drawing Sheets

(Off State)

(On State)

IN-PLANE SWITCHING MODE LIQUID CRYSTAL DISPLAY DEVICE AND METHOD FOR FABRICATING THE SAME

This application claims the benefit of Korean Patent Application No. 1999-67842, filed on Dec. 31, 1999, which is hereby incorporated by reference.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal is generated in a plane parallel to a substrate.

2. Discussion of the Related Art

Recently, liquid crystal display (LCD) devices with light, thin, and low power consumption characteristics are used in office automation equipment and video units and the like. Conventionally, the LCD device includes upper and lower substrates that are attached together with a liquid crystal layer interposed therebetween. On exterior surfaces of the upper and lower substrates, polarizers or retardation films are formed.

By configuring the above-mentioned elements selectively, an irradiation of light and a refraction index are changed such that the LCD device has high brightness and contrast ratio. Recently developed LCD device adopts a twisted nematic (TN) liquid crystal. Since the TN liquid crystal has a characteristic of variable transmittance according to viewing angles, it's application to a large-sized LCD device is limited.

The LCD device having the TN liquid crystal has a symmetrical transmittance in directions of right and left and an unsymmetrical transmittance in directions of up and down. The unsymmetrical transmittance results in a reversed image. Therefore, the viewing angle of the LCD device having the TN liquid crystal has a wide viewing angle in directions of right and left, but a narrow view angle in directions of up and down. Driving methods for such LCDs typically include a twisted nematic (TN) mode and a super twisted nematic (STN) mode. Although TN-LCDs and STN-LCDs have been put to practical use, they have a drawback in that they have a very narrow viewing angle. In order to solve the problem of narrow viewing angle, IPS-LCD devices have been proposed. IPS-LCD devices typically include a lower substrate where a pixel electrode and a common electrode are disposed, an upper substrate having no electrode, and a liquid crystal interposed between the upper and lower substrates. The IPS-LCD device has advantages in a contrast ratio, gray inversion, and a color shift that are connected with the viewing angle.

FIGS. 1A and 1B respectively show on and off states of a conventional IPS-LCD device.

As shown, upper and lower substrates 17 and 19 are spaced apart from each other, a liquid crystal layer 15a is interposed between the upper and lower substrates 17 and 19, and upper and lower polarizers 21 and 23 are respectively formed on each exterior surface of the upper and lower substrates 17 and 19.

On the lower substrate 19, a pixel electrode 11 and a common electrode 13 are formed to be parallel with each other and have a gap therebetween. The pixel and common electrodes 11 and 13 include a transparent conductive material such as indium tin oxide (ITO) or indium zinc oxide (IZO), and an opaque conductive metal.

In FIG. 1A, no electric field is applied between the pixel and common electrodes 11 and 13 such that the liquid crystal 15a is aligned in its early alignment state. Namely, long axes of the liquid crystal molecules 15a are aligned to be parallel with the pixel and common electrodes 11 and 13.

On the contrary, in FIG. 1B, an electric field (not shown) is applied between the pixel and common electrodes 11 and 13 such that the long axes of the liquid crystal molecules 15a are aligned to be perpendicular to the pixel and common electrodes 11 and 13.

Since the IPS-LCD device uses the electric field parallel with the substrate, a wide viewing angle is achieved. Specifically, the viewing angle of the IPS-LCD device is about 70 degrees in direction of up, down, right, and left.

The above-mentioned pixel and common electrodes may have various structures. FIG. 2 shows a plane view of the conventional IPS-LCD device.

As shown, gate and data lines 31 and 33 cross each other to define a pixel region "P". In the pixel region P, a common electrode 35 including a plurality of sub-common electrodes 35b is formed to be perpendicular to the gate line 31, and a pixel electrode 37 including a plurality of sub-pixel electrodes 37b is also formed to be perpendicular to the gate line 31. The sub-common and sub-pixel electrodes 35b and 37b are parallel with each other and have gaps in an alternating pattern. Each end of the sub-pixel electrodes 37b is electrically connected with a transverse pixel line 37a, while each end of the sub-common electrodes 35b is electrically connected with a transverse common line 35a.

Conventionally, the sub-common electrodes 35b and the transverse common line 35a are formed in a same layer to communicate with each other. Further, the sub-pixel electrodes 37b and the transverse pixel line 37a are formed in a same layer to communicate with each other. At this point, each cross point "B" of the sub-electrodes and the transverse lines is formed to have a round with a smooth curve.

Due to the round of the cross point B, an abnormal electric field occurs at the cross point B. Namely, when the electric field is applied between the sub-electrodes in the pixel region P, only the cross point B has a different electric field throughout the pixel region P.

Before a detailed explanation about the above-mentioned abnormal electric field, referring to FIG. 3A, a direction of an orientation film will be explained. A first axis 31a is a longitudinal direction of the gate line 31, and a second axis 33a is a longitudinal direction of the data line 33. As shown, a rubbing direction 41 of the orientation film (not shown), which is used to orientate the liquid crystal molecules, have an angle of over 90 degrees with respect to the first axis 31a and towards the second axis 33a.

Now, the previously mentioned problem of the abnormal electric field will be explained in detail with reference to FIG. 3B. FIG. 3B is an enlarged view of a portion "A" of FIG. 2.

As shown, the sub-pixel electrode 37b crosses the transverse pixel line 37a in shape of a round "R" such that a distance between the sub-pixel and sub-common electrodes 35b and 37b varies around the rounded shape. Due to the above-mentioned variance of the distance, when an electric field 43 is applied to the pixel and common electrodes 35 and 37, an abnormal electric field 45 is formed in a gap "D" between the round R of the sub-pixel electrode 35b and the sub-common electrode 37b. Since the abnormal electric field 45 has a different direction from the rubbing direction 41 of FIG. 3A, the liquid crystal molecules are abnormally aligned in the gap D. The abnormal alignment of the liquid crystal molecules occurs around cross points of the sub-electrodes and the transverse lines throughout the pixel region P of FIG. 2.

Accordingly, a color dispersion occurs around the pixel region P, and a level of the gray scale changes abnormally in a middle range of the gray scale.

SUMMARY OF THE INVENTION

Accordingly, the present invention is directed to an IPS-LCD device that substantially obviates one or more of the problems due to limitations and disadvantages of the related art.

An object of the present invention is to provide an IPS-LCD device having a high luminance and a stable gray scale.

In order to achieve the above object, the first preferred embodiment of the present invention provides an in-plane switching mode liquid crystal display device, which includes a gate line and a data line on a first substrate; a pixel region defined by the gate and data lines; a switching device intersection portion between the gate and data lines; a pixel electrode and a common electrode on the first substrate, the pixel electrode having a groove around a cross point between the pixel and common electrodes; a first orientation layer on the first substrate; a second orientation layer on a second substrate; and a liquid crystal layer between the first and second substrates.

The groove has a shape of a triangle. The groove prevents a reverse electric field. The pixel electrode includes a transparent conductive material. The transparent conductive material is selected from a group consisting of indium tin oxide and indium zinc oxide. The common electrode includes an opaque metal. The gate line includes an opaque metal. The data line includes an opaque metal. The switching device includes a thin film transistor. The pixel electrode is electrically connected with a transverse pixel line. The common electrode is electrically connected with a transverse common line.

In another aspect, the present invention provides a fabricating method of an in-plane switching mode liquid crystal display device, the method includes forming a gate line and a data line on a first substrate, the gate and data lines defining a pixel region; forming a switching device intersection portion between the gate and data lines; forming a pixel electrode and a common electrode on the first substrate, the pixel electrode having a groove around a cross portion between the pixel and common electrode; forming a first orientation film on the first substrate; forming a second orientation film on a second substrate; and forming a liquid crystal layer between the first and second substrates.

The groove has a shape of a triangle. The groove prevents a reverse electric field. The pixel electrode includes a transparent conductive material. The transparent conductive material is selected from a group consisting of indium tin oxide and indium zinc oxide. The common electrode includes an opaque metal. The gate line includes an opaque metal. The data line includes an opaque metal. The switching device includes a thin film transistor. The pixel electrode is electrically connected with a transverse pixel line. The common electrode is electrically connected with a transverse common line.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
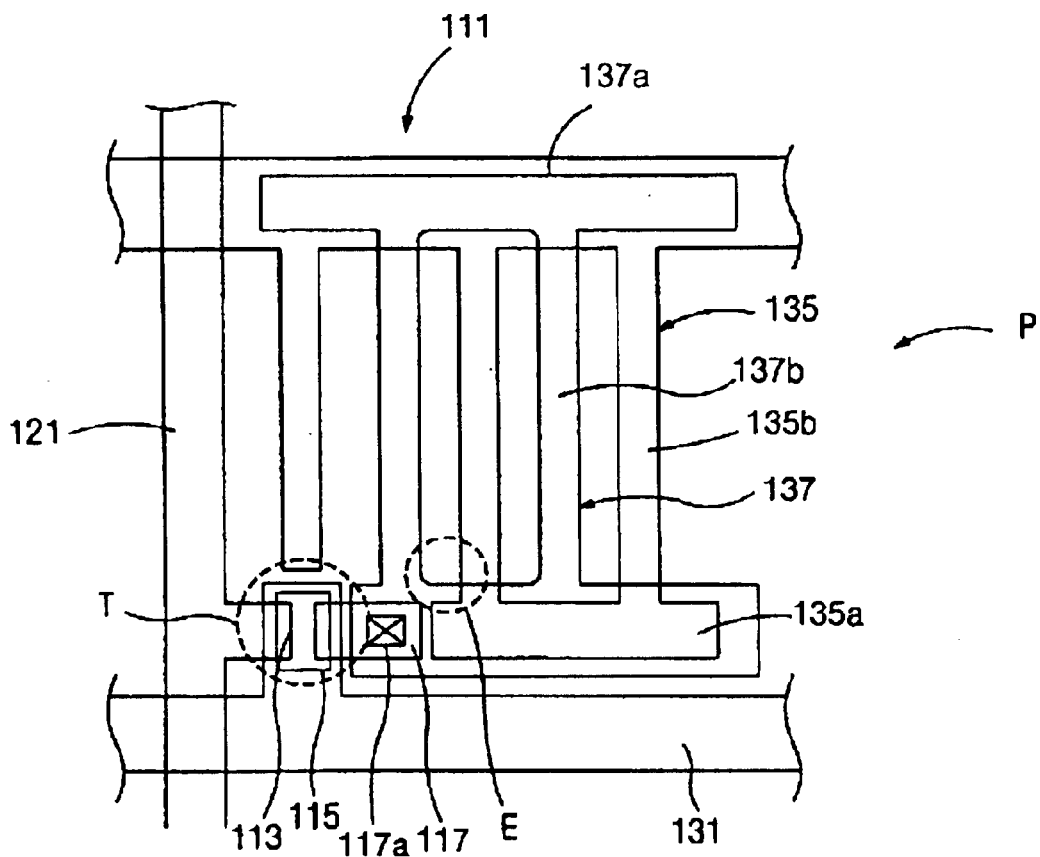
FIG. 4 is a plane view of an array substrate of an IPS-LCD device according to a preferred embodiment of the present invention.

FIG. 4 shows a pixel region "P" of a liquid crystal display device according to the preferred embodiment of the present invention.

As shown, an array substrate 111 for the liquid crystal display device includes a switching device "T" in each pixel region P, and the switching device T is a thin film transistor including a gate electrode 113, a source electrode 115, and a drain electrode 117. The gate electrode 113 is electrically connected with a gate line 131 that is transversely formed, while the source electrode 115 is electrically connected with a data line 121 that is perpendicular to the gate line 131. At this point, the gate and data lines 131 and 121 define the pixel region P.

On the pixel region, a common electrode 135 including a plurality of sub-common electrodes 135b is formed perpendicular to the gate line 131. Further, a pixel electrode 137 including a plurality of sub-pixel electrodes 137b is formed perpendicular to the gate line 131. Each sub-common and sub-pixel electrode 135b and 137b are formed in an alternating pattern.

The common electrode 135 has the same material as the gate line 131 and, the common electrode 135 and the gate line 131 are formed on a same layer, but they are electrically independent from each other. In the meanwhile, the pixel electrode 137 is spaced apart from the drain electrode 117 that is formed on the same layer as the source electrode 115 and the data line 133.

In a process of forming the pixel electrode 137, an insulating layer (not shown) is formed to cover the drain electrode 117, and a transparent conductive material or an opaque metal is deposited and patterned to form the pixel electrode 137 on the insulating layer (not shown). The transparent conductive material includes an indium tin oxide (ITO) or an indium zinc oxide (IZO). On the insulating layer, a drain contact hole 117a is formed such that the pixel electrode 137 and the drain electrode 117 electrically contact each other. Namely, the pixel electrode 137 on the insulating layer has the transparent conductive material or the opaque metal, and electrically contacts the drain contact hole 117 via the drain contact hole 117a. A first orientation layer (not shown) is formed on the insulating layer (not shown). In addition, a second orientation layer (not shown) is formed on a second substrate (not shown).

The above-mentioned sub-common and sub-pixel electrodes 135b and 137b are electrically connected with a transverse common line 135a and a transverse pixel line 137a, respectively. In the preferred embodiment of the present invention, each cross portion between the sub-electrodes and the transverse lines has a shape of a right-angled corner without a round.

Now, with reference to FIGS. 5 and 6, the above-mentioned right-angled corner will be explained in detail.

Figure 1A:
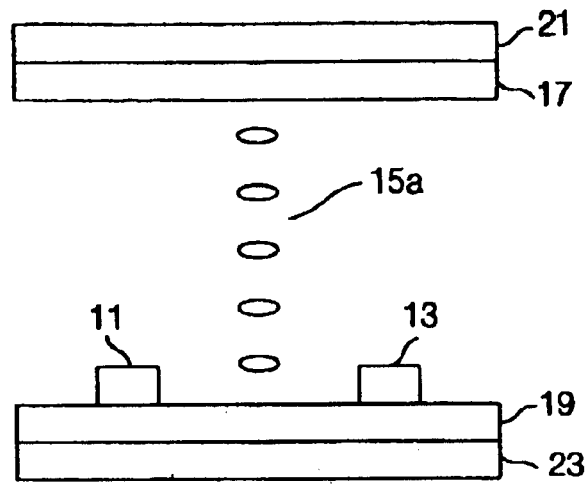
FIGS. 1A and 1B respectively illustrate "On" state and "Off" state of a conventional IPS-LCD device.
Figure 1B:
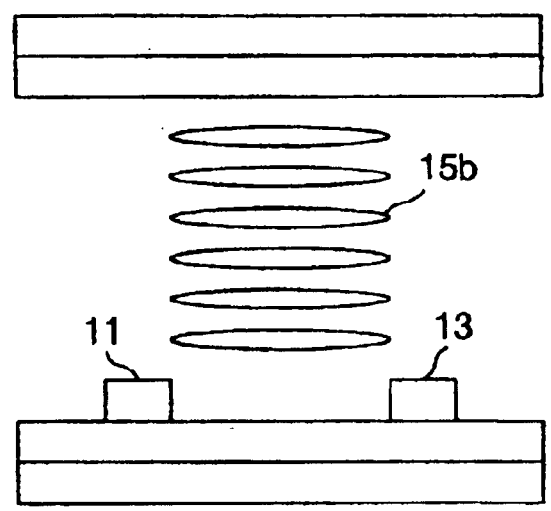
Figure 2:
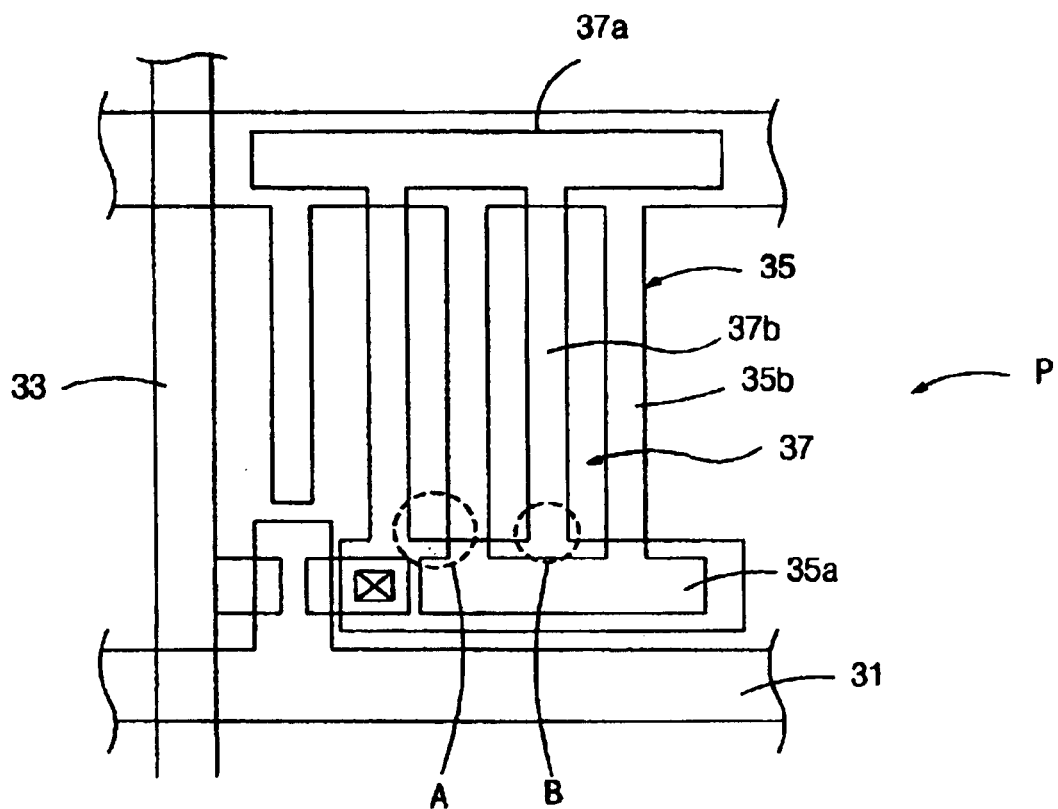
FIG. 2 is a plane view of an array substrate of the conventional IPS-LCD device.
Figure 3A:
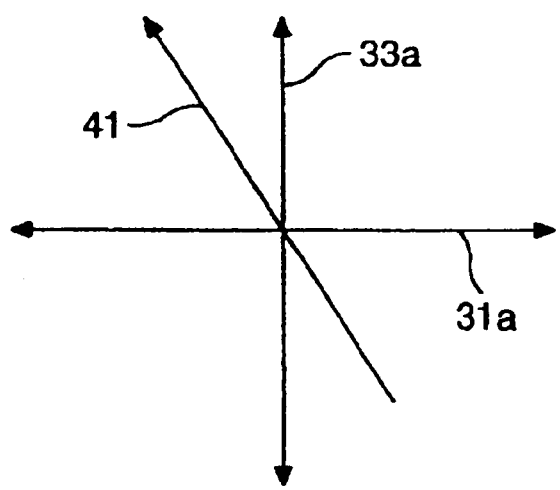
FIG. 3A illustrates a relation among a rubbing direction and directions of gate and common lines of the IPS-LCD device.
Figure 3B:
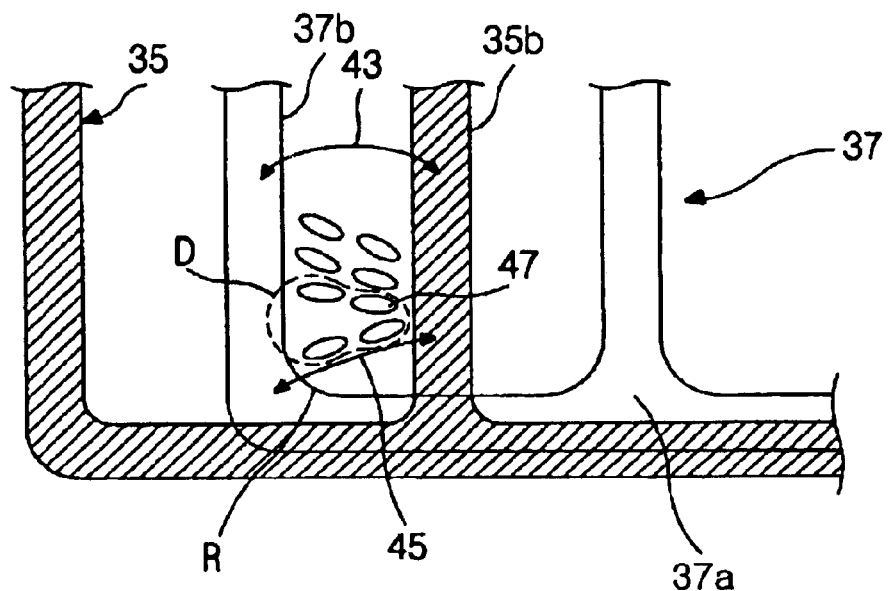
FIG. 3B is an expanded plane view of a portion "A" of FIG. 2.
Figure 5:
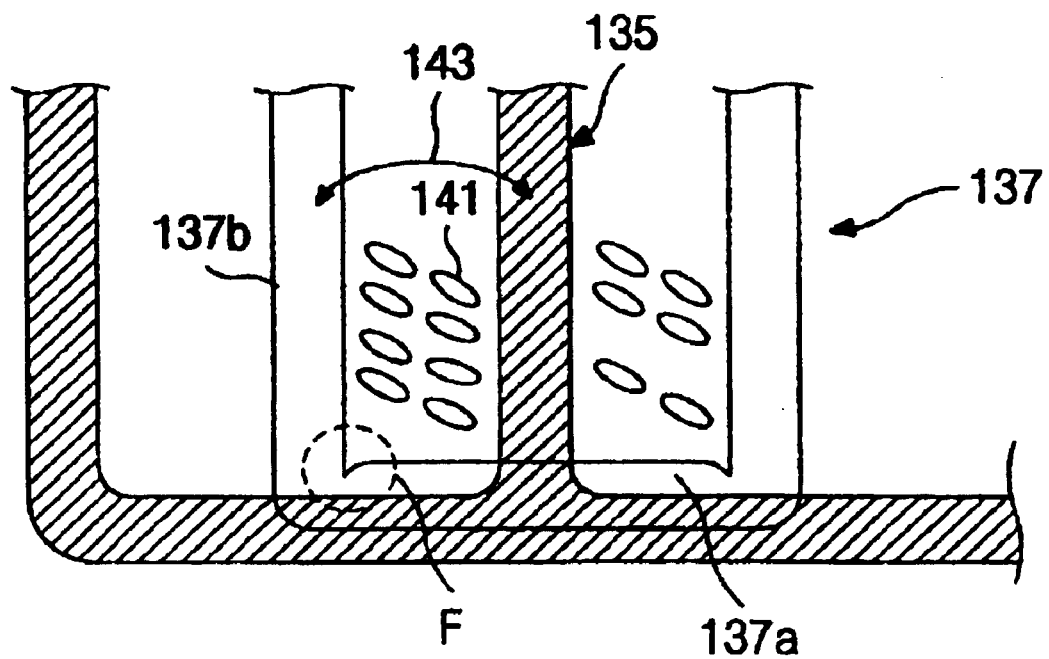
FIG. 5 is an expanded plane view of a portion "E" of FIG. 4.

FIG. 5 is an enlarged view of a portion "E" of FIG. 4. As shown, a gap between the sub-pixel electrode 137b and the sub-common electrode 135b has a uniform width along edges of the sub-pixel electrode 137b and the sub-common electrode 135b. At this point, when a voltage difference is generated between the sub-pixel electrode 137b and the sub-common electrode 135b, an electric field 143 is uniformly applied in the gap between the sub-pixel electrode 137b and the sub-common electrode 135b. Since the electric field 143 is uniform throughout the gap between the sub-pixel electrode 137b and the sub-common electrode 135b, liquid crystal molecules 141 are uniformly aligned without an abnormal alignment shown in FIG. 3B.

Figure 6:
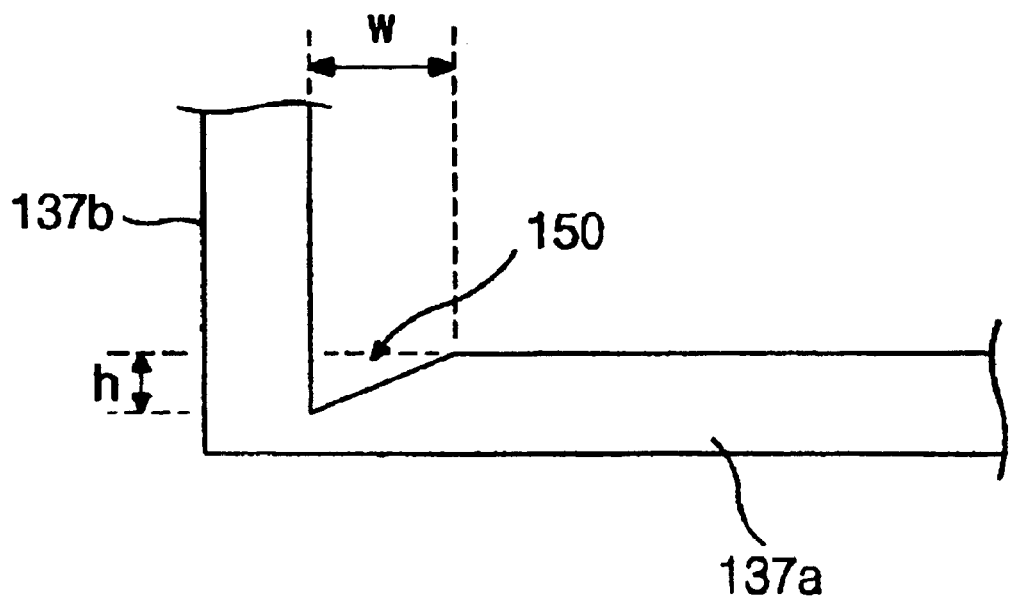
FIG. 6 is an expanded plane of a portion "F" of FIG. 5.

FIG. 6 is an enlarged view of a portion "F" of FIG. 5. As shown, when the sub-pixel electrode 137b and the transverse pixel line 137a are formed perpendicular to each other, a triangular groove 150 is formed to have a height of "h" and a width of "w". That is to say, a portion of the transverse pixel line 137a is obliquely etched away to have the height "h" from an inner edge of the transverse pixel line 137a and to have the width "w" from an inner edge of the sub-pixel electrode 137b. Due to the triangular groove 150, the distance between the sub-common electrode 135b of FIG. 5 and the sub-pixel electrode 137b is maintained uniform at the cross portion between the sub-common electrode 135b and the sub-pixel electrode 137b.

The triangular groove 150 is applied to inner corners formed inside of the pixel area P of FIG. 4. To form the triangular corner, only a compensation design is needed for a mask used to form the sub-electrodes and transverse lines.

Since the liquid crystal molecules are uniformly aligned throughout the pixel area, a high luminance and a stable gray scale are achieved.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device comprising:

a gate line and a data line on a first substrate;

a pixel region defined by the gate and data lines;

a switching device intersection portion between the gate and data lines;

a pixel electrode and a common electrode on the first substrate, the pixel electrode having a groove around a portion of a transverse pixel line at a crossing point between the pixel and common electrodes;

a first orientation layer on the first substrate;

a second orientation layer on a second substrate; and a liquid crystal layer between the first and second substrates.

2. The device of claim 1, wherein the groove has a shape of a triangle.

3. The device of claim 1, wherein the groove prevents a reverse electric field.

4. The device of claim 1, wherein the pixel electrode includes a transparent conductive material.

5. The device of claim 4, wherein the transparent conductive material is selected from a group consisting of indium tin oxide and indium zinc oxide.

6. The device of claim 1, wherein the common electrode includes an opaque metal.

7. The device of claim 1, wherein the gate line includes an opaque metal.

8. The device of claim 1, wherein the data line includes an opaque metal.

9. The device of claim 1, wherein the switching device includes a thin film transistor.

10. The device of claim 1, wherein the pixel electrode is electrically connected with the transverse pixel line.

11. The device of claim 1, wherein the common electrode is electrically connected with a transverse common line.

12. The device of claim 1, wherein the pixel electrode is electrically connected to the traverse pixel line.

13. The device of claim 1, further comprising a transverse common line.

14. The device of claim 13, wherein the common electrode is electrically connected to the transverse common line.

15. A fabricating method of an in-plane switching mode liquid crystal display device, the method comprising:

forming a gate line and a data line on a first substrate, the gate and data lines defining a pixel region;

forming a switching device intersection portion between the gate and data lines;

forming a pixel electrode and a common electrode on the first substrate, the pixel electrode having a groove around a portion of a transverse pixel line at a crossing portion between the pixel and common electrodes;

forming a first orientation film on the first substrate;

forming a second orientation film on a second substrate; and forming a liquid crystal layer between the first and second substrates.

16. The method of claim 15, wherein the groove has a shape of a triangle.

17. The method of claim 15, wherein the groove prevents a reverse electric field.

18. The method of claim 15, wherein the pixel electrode includes a transparent conductive material.

19. The method of claim 18, wherein the transparent conductive material is selected from a group consisting of indium tin oxide and indium zinc oxide.

20. The method of claim 15, wherein the common electrode includes an opaque metal.

21. The method of claim 15, wherein the gate line includes an opaque metal.

22. The method of claim 15, wherein the data line includes an opaque metal.

23. The method of claim 15, wherein the switching device includes a thin film transistor.

24. The method of claim 15, wherein the pixel electrode is electrically connected with the transverse pixel line.

25. The method of claim 15, wherein the common electrode is electrically connected with a transverse common line.

26. An in-plane switching liquid crystal display device, comprising:
    first and second substrates;
    gate lines in a first direction on the first substrate;
    data lines in a second direction on the first substrate;
    whereby the gate and data lines define pixel regions;
    each pixel region including:
    a thin film transistor;
    a common electrode on the first substrate parallel to the gate lines;
    sub-common electrodes connected to the common electrode and perpendicular to the gate lines;
    a transverse common line perpendicular to the sub-common electrodes and intersecting at least one of the sub-common electrodes;
    a pixel electrode on the first substrate parallel to the gate lines;
    sub-pixel electrodes connected to the pixel electrode and perpendicular to the gate lines;
    a transverse pixel line perpendicular to the sub-pixel electrodes and intersecting at least one of the sub-pixel electrodes; and
    a projection formed at an intersection of the transverse common line and the at least one sub-common electrode.

27. The in-plane switching liquid crystal display device of claim 26, wherein the projection has a triangular shape.

28. The in-plane switching liquid crystal display device of claim 26, wherein the projection has a predetermined height from an inner edge of the transverse common line and a predetermined width from an inner edge of the sub-common electrode.

29. The in-plane switching liquid crystal display device of claim 26, wherein the sub-common electrodes and the sub-pixel electrodes form an alternating pattern.

30. An in-plane switching liquid crystal display device, comprising:
    first and second substrates;
    gate lines in a first direction on the first substrate;
    data lines in a second direction on the first substrate;
    whereby the gate and data lines define pixel regions;
    each pixel region including:
        a thin film transistor;
        a common electrode on the first substrate parallel to the gate lines;
        sub-common electrodes connected to the common electrode and perpendicular to the gate lines;
        a transverse common line perpendicular to the sub-common electrodes and intersecting at least one of the sub-common electrodes;
        a pixel electrode on the first substrate parallel to the gate lines;
        sub-pixel electrodes connected to the pixel electrode and perpendicular to the gate lines;
        a transverse pixel line perpendicular to the sub-pixel electrodes and intersecting at least one of the sub-pixel electrodes; and
        a projection formed at an intersection of the transverse pixel line and the at least one sub-pixel electrode.

31. The in-plane switching liquid crystal display device of claim 30, wherein the projection has a triangular shape.

32. The in-plane switching liquid crystal display device of claim 30, wherein the projection has a predetermined height from an inner edge of the transverse pixel line and a predetermined width from an inner edge of the sub-pixel electrode.

33. The in-plane switching liquid crystal display device of claim 30, wherein the sub-common electrodes and the sub-pixel electrodes form an alternating pattern.

* * * * *